Oct. 20, 1959
A. GRIMAL
2,908,986
FILM MASK
Filed July 11, 1958
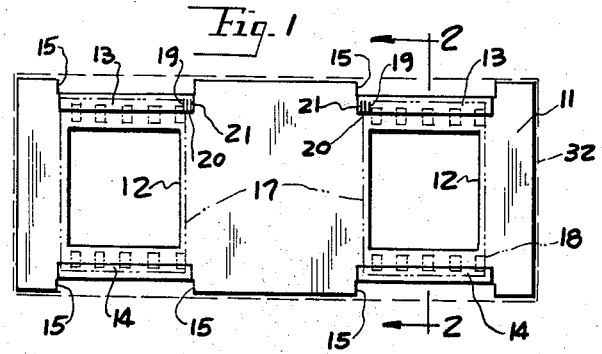
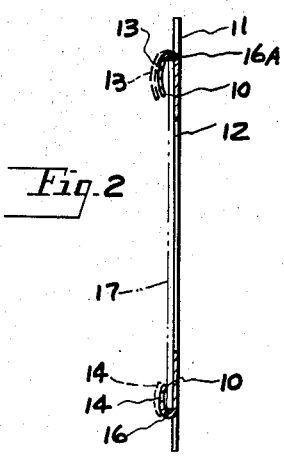
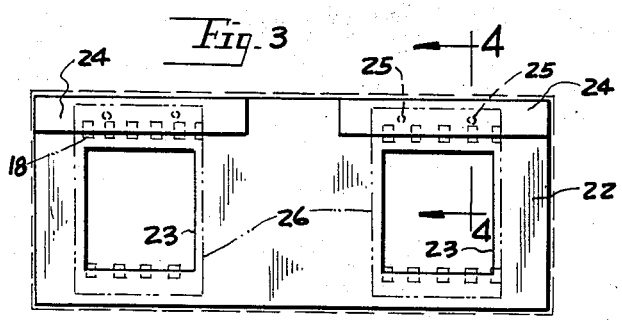
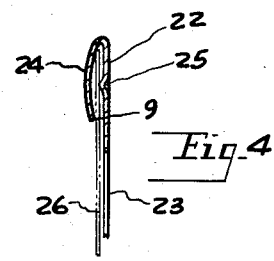
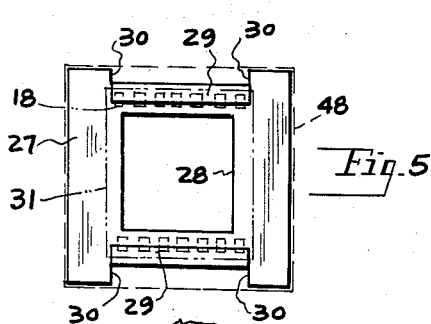
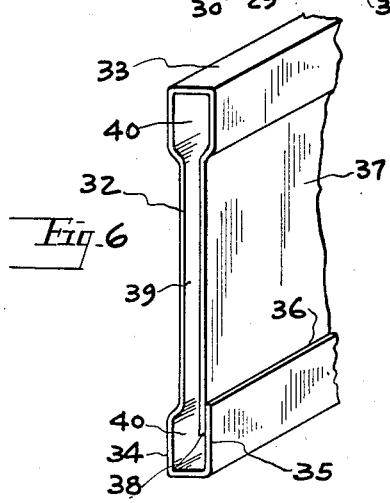
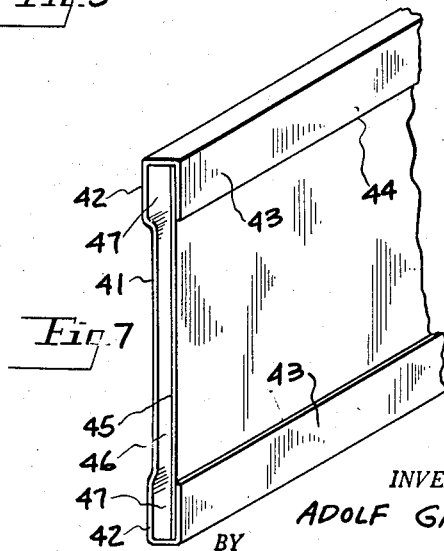
INVENTOR.
ADOLF GRIMAL
BY
Robert A. Sloman
ATTORNEY United States Patent Office 2,908,986
Patented Oct. 20, 1959

2,908,986
FILM MASK
Adolf Grimal, Walled Lake, Mich.
Application July 11, 1958, Serial No. 748,075
5 Claims. (Cl. 40—152)

This invention relates to the mounting of film transparencies or steroscopic films, and more particularly to a metallic mask formed for mounting and adjustably securing film transparencies thereon.

Heretofore various devices made of metal or cardboard have been employed for securing film transparencies or for the mounting of a pair of stereoscopic films. Most of these are cumbersome, and only partially effective for the intended purpose.

It is the object of the present invention to provide a novel film transparency mount employing a thin, flexible and resilient metallic plate transversely apertured, together with means for fixedly anchoring a film transparency thereon.

It is a further object of the present invention to provide a thin flexible metallic plate having a pair of spaced apertures together with mounting and securing means for adjustably retaining a pair of stereoscopic films thereon.

It is the further object to provide a thin flexible metallic plate as a film mount for a film transparency or for a pair of stereoscopic films, together with preformed securing tabs for initially yet loosely retaining the respective film or films thereon, whereby the same may be respectively adjusted longitudinally and vertically, and incorporating a temporary holding means and wherein the said tabs may be pressed against the plate for fixedly securing the adjusted film in position.

It is a further object to provide a one-piece clear plastic envelope assembly adapted to supportably enclose a film or a pair of stereoscopic films upon the present mounting masks.

These and other objects will be seen from the following specification and claims in conjunction with the appended drawing in which:

Fig. 1 is a front elevational view of a stereoscopic film mount with the films and the plastic envelope shown in phantom.

Fig. 2 is a section taken on line 2—2 of Fig. 1, but on an enlarged scale.

Fig. 3 is a front elevational view of a slightly different form of stereoscopic film mount with the films and plastic envelope shown in phantom.

Fig. 4 is a fragmentary section taken on line 4—4 of Fig. 3, but on an enlarged scale.

Fig. 5 is a front elevational view of a film transparency mount with the film and protective plastic envelope shown in phantom.

Fig. 6 is a fragmentary perspective view of one form of plastic envelope for said film mounts, shown on an enlarged scale.

Fig. 7 is a fragmentary perspective view of a slightly different form of plastic envelope for said film mounts, shown on an enlarged scale.

It will be understoood that the above drawing illustrates merely preferred embodiments of the invention and that other embodiments are contemplated within the scope of the claims hereafter set forth.

The present invention is directed to masks for the mounting and adjustably securing of a film transparency or a pair of stereoscopic films, and wherein the mask is constructed of a thin flexible resilient metallic material which may be of aluminum of other material.

Metallic plate 11 has centrally formed therethrough a pair of longitudinally spaced rectangular apertures 12. Relative to each of apertures 12 there are provided pairs of inwardly directed or inturned film mounting tabs 13—14 as shown in Fig. 1.

Upper and lower edge portions of the mask plate 11 are cut vertically as at 15 and the respective tabs 13—14 are folded inwardly and take the initial dotted line position 13, Fig. 2. As shown in dotted lines, tabs 13—14, as initially folded, define a pair of aligned sets of channels to guidably and slidably receive film 17 at their top and bottom edges with a slip-fit as at 16 and 16A, Fig. 2. Guides 16 and 16A thus locate films vertically, limiting the film adjustments to horizontal movements only.

Said tabs when first folded are of arcuate form. In the initial construction of the mask shown in Fig. 1, the pair of stereoscopic films 17 are loosely mounted against one surface of mask plate 11 with their top and bottom margins retainingly engaged by the upper and lower tabs 13—14 respectively, as indicated in dotted lines.

The hand mounting method of lining up the stereoscopic films is employed. The films 17, Fig. 1, are adjusted longitudinally with reference to the score marks 19, 20 and 21. The respective film elements at their inner edges are manually adjusted for registry with one of the indicating means 19, 20 or 21.

For example, in the event the stereoscopic films cover distance shots, the inner edges of the film elements are manually adjusted for vertical registry with the score marks or indicating means 21. For medium distance shots, the film edges are adjusted to register with the intermediate scorings 20 while for closeups the said film edges are manually adjusted to register with scorings 19 formed on tabs 13.

In the preferred embodiment the indicating lines 19—20—21 represent scoring made in the material of the tabs 13 and thus provide a simple and convenient means of manual adjustment without the benefit of a 3-dimensional projector.

After the respective films 17 have been manually adjusted longitudinally the tabs 13—14 are crimped or otherwise compressed inwardly towards plate 11. In view of the resilient character of the metal of plate 11 and the arcuate formation, as shown in dotted lines, Fig. 2, after initial compression the tabs will spring back to the solid line indication shown in Fig. 2 at 13 and 14, so that interior longitudinal margins 10 retainingly engage top and bottom edge portions of films 17.

A variation of the present mask is shown in Figs. 3 and 4, which includes elongated rectangular plate 22 of steel or aluminum or other flexible resilient material.

A pair of longitudinally spaced centrally positioned rectangular apertures 23 are formed through plate 22. A pair of longitudinally spaced film holddown tabs 24 are turned downwardly from the upper edge of plate 22 respectively above apertures 23. These tabs are adapted to receive upper edge portions of a pair of vertically and horizontally adjustable stereoscopic films 26, shown in phantom.

Tabs 24 are also of arcuate cross section as shown in Fig. 4, which illustrates the position of said tabs before pressing of the same inwardly relative to plate 22.

For projection mounting, a suitable 3-dimensional standard projector is employed. Mask 22, Fig. 3, is mounted upon a slide support or other holder within the projector. The lower edges of stereo films 26 are gripped in a suitable projection mounting device that will adjust the films vertically and horizontally with the mask in place and with the top edges of the films arranged under tabs 24. Such a stereo projection slide mounting device is shown in my co-pending patent application, Serial Number 532,829, filed September 7, 1955 entitled Stereo Projection Slide Mounting Fix. This device has remote controls thereon whereby with the device within the projector the respective films may be manually adjusted vertically and horizontally until the film images on a screen are perfectly superimposed.

The respective films 26 are longitudinally and vertically adjusted relative to tabs 24, until the projected film images are properly superimposed. The adjusting fixture with assembled mask is then removed from the projector and tabs 24 are compressed or flattened against portions of the attached films.

The spring-back of the material of the flexible tabs is such that after the initial compression, the tabs, of initial arcuate shape, will regain the arcuate shape shown in Fig. 4, but with the marginal edges of the respective tabs retainingly engaging the film elements 26 along lines 9, as shown in Fig. 4.

Normally mask 22 with adjusted films 26 is positioned upon a mounting device and the tabs 24 are pressed in to fixedly secure said films. A pair of dimpling pins may be employed on the mounting device arranged under the mask body 22 and below tabs 24. The pressing down of tabs 24 thus forms the forwardly projecting dimples 25 which further help secure the films to the mask in cooperation with the inwardly pressed tabs. This completes the assembly of mask 22, Fig. 3, after which it may be inserted in a plastic protective envelope as in Figs. 6 and 7.

Fig. 5 illustrates a slight variation in the present invention as adapted to the mounting of a single film transparency upon a mask. For this purpose there is provided a rectangular plate 27, which is relatively thin and is constructed of a metal which renders such plate flexible and resilient.

Centrally arranged rectangular aperture 28 is formed through plate 27. The inwardly directed oppositely arranged tabs 29 are formed from top and bottom portions of plate 27, said plate being transversely slit along lines 30 for this purpose. Said tabs 29 provide a suitable support, guide means and close vertical line-up for film transparency 31 indicated in dotted lines.

In this construction film 31 is centrally located with respect to aperture 28 utilizing the sprocket openings 18, if desired, after which the tabs 29, of an initial arcuate shape in cross section, are compressed towards plate 27 for retaining engagement with film 31, similar to the showing of Fig. 2.

In conjunction with any of the masks shown in Figs. 1, 3 and 5, there is provided as a part of the present invention a clear plastic cover. Referring to Fig. 6, said cover consists of an envelope of clear plastic material such as polyethylene or equivalent material which is open at its respective opposite ends to permit insertion of the assembled mask.

The envelope of Fig. 6 includes upright plate 32 which terminates at its upper and lower edges in the transversely enlarged inwardly facing hollow bodies 33—34. The lower body includes the upright edge portion 35 with longitudinal edge 36 spaced vertically below body 33.

The upper body 33 terminates in the depending upright plate 37 which is parallel to and spaced from plate 32 and has at its lower end a free marginal edge 38 which overlies the interior surface of the upturned edge portion 35, completing the envelope.

Plates 32—37 define the central narrow slot 39 whereas bodies 33—34 define the upper and lower enlarged grooves 40 adapted to receive the turned-down tabs above described upon insertion of the assembled film masks between plates 32—37.

The envelope shown in Fig. 6 thus provides a protective cover for the assembled film masks which are normally stored therein. Plates 32—37 are displaced inwardly of the margins of bodies 33—34 so that positioning of said bodies upon a horizontal support will not scratch the windowlike surface plates 32—37. Accordingly a clear image of the film transparency is possible.

A similar construction is shown in Fig. 7 wherein the mask cover consists of an envelope of clear plastic material open at its ends. The envelope consists of an elongated upright plate 41 in the form of a window which terminates at its opposite longitudinal edges in the enlarged inwardly directed hollow bodies 42. Said bodies terminate in the horizontally elongated vertically spaced aligned edge portions 43, which in effect define a longitudinal slot throughout the rear of the envelope assembly 41—42.

This slot is closed by the elongated upright transparent plate 45 of rectangular shape, preferably plastic, which lies parallel to and is spaced from plate 41 with its longitudinal edges bearing against interior surfaces of edge portions 43. This assembly defines the elongated slot 46 with enlarged end slots 47 adapted to cooperatively receive the completed masks. Here also both of the plates 41 and 45 are displaced inwardly of the outer edges of bodies 42 to prevent scratching of the windowlike surfaces 41 and 45.

Both of the envelopes in Figs. 6 and 7 provide a protective enclosure for the assembled film masks. Such an envelope is shown at 48 in Fig. 5.

Having described my invention, reference should now be had to the following claims:

I claim:

1. A film transparency mask comprising a thin resilient and flexible metallic plate of rectangular shape, there being a centrally positioned rectangular aperture therethrough, a pair of opposed horizontally extending inturned resilient tabs at the top and bottom of said plate respectively above and below said aperture adapted to slidably and supportably receive the respective top and bottom margins of a film transparency juxtaposed relative to said aperture, interior elongated portions of said tabs retainingly engaging top and bottom edge portions of said transparency, said tabs being arcuate in cross section and initially of a form to loosely engage said transparency, said tabs being pressed inwardly towards said plate, the inherent springback in said tabs providing line contacts of the tab edges with said transparency.

2. A stereoscopic film mask comprising a thin resilient flexible metallic plate of rectangular shape, there being a pair of longitudinally spaced centrally positioned rectangular apertures therethrough, a pair of longitudinally spaced film holddown tabs turned downwardly from the upper end of said plate, respectively above said apertures, adapted to receive upper edge portions of a pair of vertically and horizontally adjustable stereoscopic films, said tabs being arcuate in cross section and retainingly securing said film in adjusted position, being pressed toward said plate, the inherent springback in said tabs providing a line contact with said films, and a pair of forwardly extending dimples formed in said plate rearwardly of each of said tabs and cooperable therewith in the securing of said films upon said plates.

3. A stereoscopic film mask comprising a thin resilient flexible metallic plate of rectangular shape, there being a pair of longitudinally spaced centrally positioned rectangular apertures therethrough, a pair of opposed horizontally extending inturned resilient tabs at the top and bottom of said plate respectively above and below each of said apertures, each pair of tabs adapted to slidably and supportably receive the respective top and bottom margins of a film transparency juxtaposed relative to said apertures, interior elongated portions of said tabs retainingly engaging top and bottom edge portions of said transparencies, the said tabs being arcuate in cross section and initially of a form to loosely engage said transparencies, said tabs being pressed inwardly towards said plate, the inherent spring-back in said tabs providing line contacts of the tab edges with said transparencies.

4. A film transparency mask comprising a thin resilient and flexible metallic plate of rectangular shape, there being a centrally positioned rectangular aperture therethrough, a pair of opposed horizontally extending inturned resilient tabs at the top and bottom of said plate reverse turned therefrom respectively above and below said aperture overlying said plate, said tabs and plate adapted to slidably and supportably receive therebetween the respective top and bottom margins of a film transparency juxtaposed relative to said aperture, and peripherally overlying said plate, interior elongated portions of said tabs retainingly gripping top and bottom edge portions of said transparency against said plate.

5. A stereoscopic film mask comprising a thin resilient flexible metallic plate of rectangular shape, there being a pair of longitudinally spaced centrally positioned rectangular apertures therethrough, a pair of opposed horizontally extending inturned resilient tabs at the top and bottom of said plate reverse turned therefrom respectively above and below each of said apertures overlying said plate, each pair of tabs and adjacent plate adapted to slidably and supportably receive therebetween the respective top and bottom margins of a film transparency juxtaposed relative to said apertures and peripherally overlying said plate, interior elongated portions of said tabs retainingly gripping top and bottom edge portions of said transparencies against said plate.

References Cited in the file of this patent

UNITED STATES PATENTS

| | | |
|---|---|---|
| 2,292,312 | Wittel | Aug. 4, 1942 |
| 2,385,771 | Bogue | Oct. 2, 1945 |
| 2,586,176 | Olsen | Feb. 19, 1952 |
| 2,736,975 | Grotthuss | Mar. 6, 1956 |
| 2,752,712 | Hase et al. | July 3, 1956 |
| 2,823,472 | Waller | Feb. 18, 1958 |
| 2,834,136 | Kiehl et al. | May 13, 1958 |
| 2,842,882 | Green et al. | July 15, 1958 |
| 2,845,734 | Brady | Aug. 5, 1958 |